United States Patent [19]

Ohta et al.

[11] 3,969,000
[45] July 13, 1976

[54] BRAKE HYDRAULIC PRESSURE CONTROL VALVE

[75] Inventors: Yoshimoto Ohta, Kawasaki; Yoshihiro Hayashida, Chigasaki; Haruyuki Amano, Ebina, all of Japan

[73] Assignee: Tokico Ltd., Japan

[22] Filed: Jan. 30, 1975

[21] Appl. No.: 545,699

[30] Foreign Application Priority Data

| Feb. 5, 1974 | Japan | 49-14789 |
|---|---|---|
| Feb. 6, 1974 | Japan | 49-15222 |
| Nov. 28, 1974 | Japan | 49-137190 |

[52] U.S. Cl. .......................... 303/6 C; 303/84 R
[51] Int. Cl.² ................................. B60T 8/26
[58] Field of Search ............ 303/6 C, 6 R, 84 A, 303/84 R; 188/345

[56] References Cited
UNITED STATES PATENTS

| 2,931,178 | 4/1960 | Straus | 303/84 A X |
| 3,627,385 | 12/1971 | Stokes | 303/6 C |
| 3,729,237 | 4/1973 | Ishikawa et al. | 303/6 C X |

Primary Examiner—Duane A. Reger
Attorney, Agent, or Firm—Wenderoth, Lind & Ponack

[57] ABSTRACT

A brake hydraulic pressure control valve adapted for use between two independent braking circuits in a dual hydraulic braking system of a vehicle. The valve includes a housing, two liquid passages provided in the housing and each having one end connected to a source of hydraulic pressure and the other end connected to a brake cylinder. Two valve members are slidably disposed in a bore of the housing, inner ends of which oppose each other, and outer ends of which are exposed to one of the liquid passages, and each being provided with a valve for controlling liquid flow in the one liquid passage. A spring is disposed between the opposed inner ends of the valve members so as to act on the members simultaneously, whereby braking pressure can be balanced.

6 Claims, 7 Drawing Figures

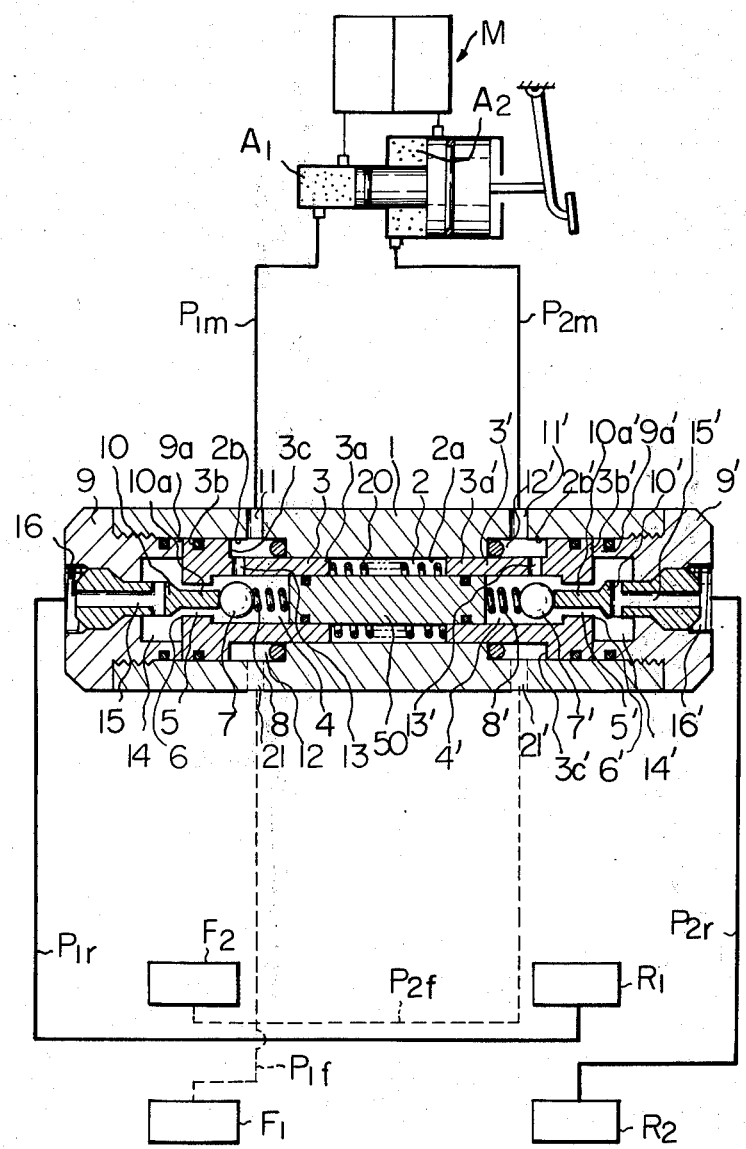

"3,969,000"

BRAKE HYDRAULIC PRESSURE CONTROL VALVE

BACKGROUND OF THE INVENTION

This invention relates to a brake pressure control valve adapted for use in a dual-system type hydraulic braking system of a vehicle.

It is known to arrange a brake pressure control valve in a hydraulic braking system of a vehicle for controlling the brake pressure delivered to the rear wheels of the vehicle so as to change the ratio between the brake pressure delivered to the rear wheels compared to the brake pressure delivered to the front wheels. The valve can permit maximum utilization of both front and rear brakes before skidding occurs. However, various brake pressure control valves heretofore proposed are intended to control the brake pressure in a single-system type hydraulic braking system. Thus, such valves cannot control the brake pressure in two or more braking systems and, in such case, an independent valve must be arranged in each of the independent braking systems.

In a dual-system type or a split-system type hydraulic braking system in which the brake cylinder of the right side rear wheel is connected to a pressure space in a master cylinder different from a pressure space in the master cylinder connected to the brake cylinder of the left side rear wheel, it is very difficult to maintain the operating characteristics of each of the pressure control valves disposed between each of the pressure spaces and each of the brake cylinders of the rear wheels perfectly identical moreover, the pressures supplied from the pressure spaces of the master cylinder are not necessarily equal, therefore, the braking force in each of the rear wheels will become unbalanced.

SUMMARY OF THE INVENTION

It is a principal object of this invention to provide a brake pressure control valve adapted for use in a dual-system type hydraulic braking system which can control the braking pressure supplied to each of the rear wheels simultaneously so as to attain equal braking pressure in both rear wheels.

Another object of this invention is to provide a brake pressure control valve of simple and compact construction.

BRIEF DESCRIPTION OF THE DRAWINGS

Further objects and advantages of this invention will appear to those skilled in the art to which this invention relates from the following description and appended drawings illustrating some preferred embodiments in which:

FIG. 6 is a longitudinal cross-sectional view of a still further embodiment of this invention.

Like reference numerals and symbols designate like parts on the drawings and in the description.

DETAILED DESCRIPTION OF EMBODIMENTS

Figure 1:
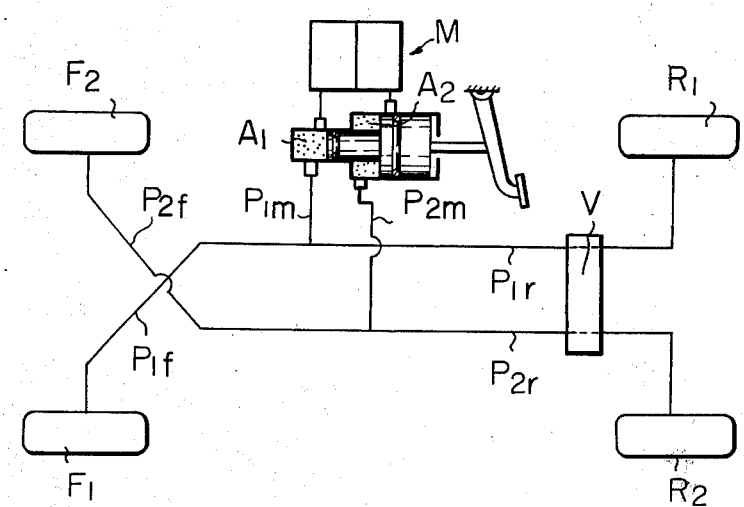
FIG. 1 is a schematic view of a dual-system type hydraulic braking system incorporating a brake pressure control valve of this invention.

The dual-system type hydraulic braking system illustrated in FIG. 1 comprises a source M of hydraulic pressure such as a master cylinder having a first pressure space $A_1$ connected through lines $P_{1m}$, $P_{1f}$ and $P_{1r}$ to, for example, a brake cylinder $F_1$ of the left side front wheel and to a brake cylinder $R_1$ of the right side rear wheel so as to form a first braking circuit, and a second pressure space $A_2$ connected through lines $P_{2m}$, $P_{2f}$ and $P_{2r}$ to a brake cylinder $F_2$ of the right side front wheel and to a brake cylinder $R_2$ of the left side rear wheel so as to form a second braking circuit. A brake pressure control valve V according to this invention is disposed in the lines $P_{1r}$ and $P_{2r}$ and, controls the braking pressure in these lines simultaneously.

Figure 2:
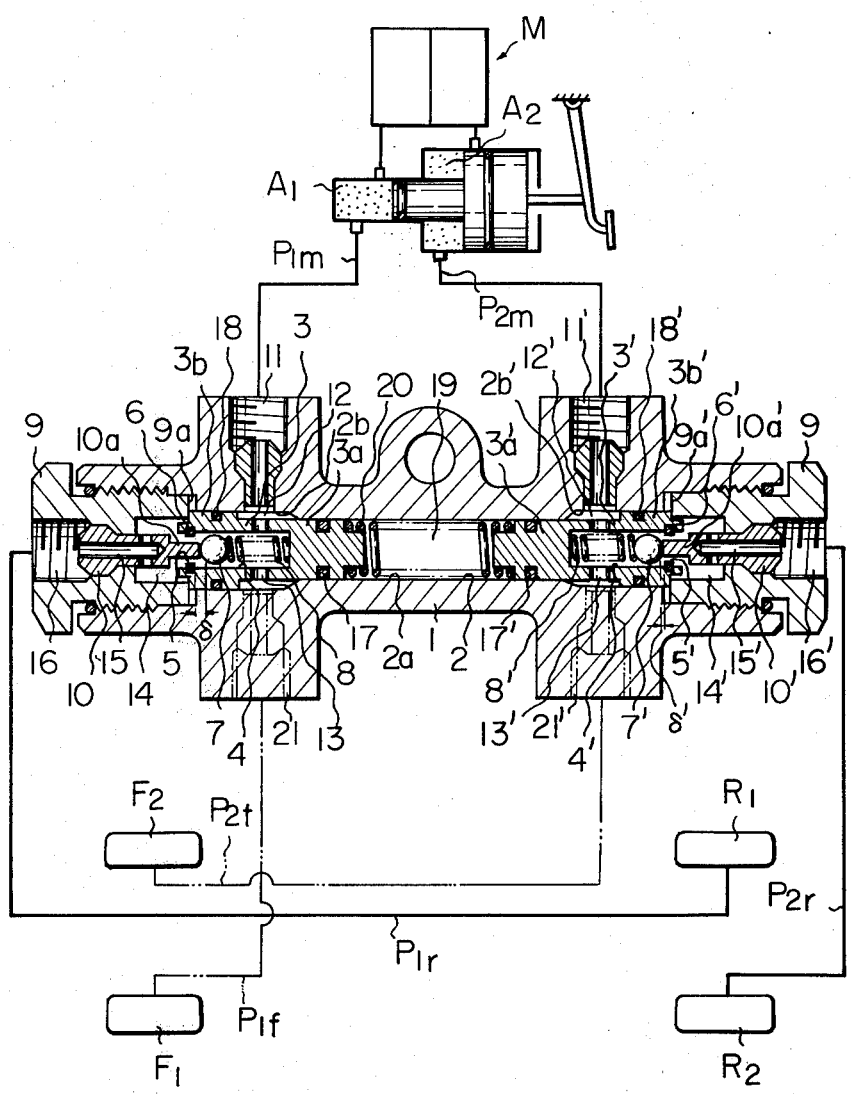
FIG. 2 is a cross-sectional view of the brake pressure control valve illustrated in FIG. 1.

Referring particularly to FIG. 2, a brake pressure control valve according to this invention comprises a housing 1 having a longitudinal through bore 2. The bore 2 includes a small diameter portion 2a and large diameter portions 2b which are connected to both ends of the small diameter portion 2a.

A valve member 3 having a small diameter portion 3a slidably fitted in the small diameter portion 2a of the bore 2 and a large diameter portion 3b slidably fitted in one large diameter portion 2b of the bore 2 is disposed in the left side portion of the housing 1. A recess 4 is formed in the valve member 3 so as to open toward the large diameter portion side or the outward side thereof, and an annular valve seat 6 having an aperture 5 is secured in the recess 4.

A valve ball 7 urged toward the valve seat 6 by means of a valve spring 8 is incorporated in the recess 4 of the valve member 3.

Shown at 9 is a cap threaded into the housing 1 so as to close the left end of the large diameter portion 2b of the bore 2. A valve rod 10 fixed to the central portion of the cap 9 extends toward the recess 4 of the valve member 3. The extreme end 10a of the valve rod 10 extends into the recess 4 freely through the aperture 5 and holds the valve ball 7 at a position spaced by a predetermined distance δ from the valve seat 6 when the end surface of the large diameter portion 3b of the valve body 3 abuts against the inner end 9a of the cap 9 so as to maintain the valve in opened condition.

Shown at 11 is an inlet disposed in the housing 1, through which pressurized liquid supplied from the pressure space $A_1$ of a source of hydraulic pressure M such as a master cylinder flows into an annular space 12 defined by the large diameter portion 2b of the through bore 2, the small diameter portion 3a of the valve member 3 and an annular shoulder 3c of the valve member 3. Shown at 13 is a bore formed in the valve member 3 for communicating the annular space 12 with the recess 4. Shown at 14 is a recess formed in the cap 9 and connected with the recess 4 through the aperture 5. Shown at 15 is passage formed in the valve rod 10 for connecting the recess 14 with an outlet 16 which is formed in the cap 9 and is communicated with a brake cylinder $R_1$ of the right side rear wheel through a line $P_{1r}$. Thereby a liquid passage comprising the inlet 11, the annular recess 12, the bore 13, the recess 4, the aperture 5, the recess 14, the passage 15 and the outlet 16 is formed in the housing 1, and defines a first braking circuit in cooperation with the pressure space $A_1$, lines $P_{1m}$ and $P_{1r}$, and the brake cylinder $R_1$ of the right side rear wheel.

Seal rings 17 and 18 are disposed in the outer peripheries of the small and large diameter portions $3a$ and $3b$ of valve member 3.

The right side portion of the through bore 2, in the view of FIG. 2, incorporates a structure symmetrically identical to that in the left side portion described above and, the corresponding parts are identified by the same reference numerals but with a prime and, therefore a detailed description thereof will be omitted.

The right side inlet 11' is connected to a second pressure space $A_2$ of the source of hydraulic pressure M which is separated from the pressure space $A_1$ connected to the left side of the housing. The right side outlet 16' is connected to a brake cylinder $R_2$ of the left side rear wheel. Thus, a second braking circuit is formed by the left side rear wheel brake cylinder $R_2$, lines $P_{2m}$ and $P_{2r}$, the second pressure space $A_2$ and a liquid passage formed in the housing for connecting the inlet 11' to the outlet 16'.

A space 19 is formed within the small diameter portion $2a$ of the through bore 2 between the two valve members 3 and 3'. There is received in the space 19 a spring 20 for urging the valve members 3 and 3' in directions away from each other, whereby the members 3 and 3' abut with respective caps 9 and 9' in the inoperative condition of the control valve. The spring 20 also acts to determine the operating pressure of the control valve.

The operation of the control valve will now be explained.

Assuming that a driver of the vehicle actuates the source of hydraulic pressure M such as a master cylinder for braking the vehicle, pressurized liquid produced in the pressure space $A_1$ in the first braking circuit flows into the inlet 11 through the line $P_{1m}$, and then is supplied, through a liquid passage including the annular space 12, the bore 13, the recess 4, the aperture 5, the recess 14, the passage 15 and the outlet 16, to the right side rear wheel brake cylinder $R_1$. And in the second braking circuit, pressurized liquid flows from the second pressure space $A_2$ to the inlet 11' through the line $P_{2m}$, and is supplied, through a liquid passage formed in the right side portion of the housing including the outlet 16', to the left side rear wheel brake cylinder $R_2$.

When a predetermined pressure is built up in the outlets, 16, 16', i.e. when a force obtained by multiplying the liquid pressure by the effective pressure receiving area of the valve member 3 or 3' exceeds the compression force transmitted to the valve members from the spring 20, the valve members 3 and 3' begin to move toward each other by compressing the spring 20. When the valve members 3 and 3' move by the distances $\delta$ and $\delta'$ respectively, the valve balls 7 and 7' will seat against the valve seats 6 and 6' so as to close the apertures 5 and 5'.

Thereafter, when the pressure in the source M is elevated, such that the inlet pressure acting on the differential area portion between the large and small diameter portions of the valve members 3 and 3' or the annular shoulder portions $3c$ and $3c'$ becomes higher than the outlet pressure in the outlets 16 and 16', the valve members 3 and 3', will move in directions away from each other, whereby the valve seats 6 and 6' move away from the valve balls 7 and 7' which are retained by means of the extreme ends $10a$ and $10a'$ of the valve rods 10 and 10', so that the apertures 5 and 5' will again become open. Thus, pressure in the outlets 16 and 16' will be elevated at a reduced rate relative to pressure in the inlets 11 and 11'.

The spring 20 transmits equal spring forces to the valve members 3 and 3', thus, the initial operating pressures of the valve members 3 and 3' are maintained equal and, moreover, since two valve members 3 and 3' move freely in the axial direction by interposition of the spring 20 therebetween, in their normal operating condition, the hydraulic pressures in the two braking circuits are maintained equal to each other.

Thus, even when there is a pressure difference between the inlets 11 and 11', the hydraulic pressures supplied to the brake cylinders of the rear wheels are maintained equal after the valve members 3 and 3' have been actuated, whereby the braking force of the rear wheels can be balanced.

The brake pressure control valve of this invention is intended to control the hydraulic pressures supplied to the rear wheels, but it may very easily be connected to the braking lines for the front wheels. Since brake cylinders of the front wheels may usually be connected to pressure spaces of a master cylinder directly, outlets 21 and 21' which open outward from the annular spaces 12 and 12' respectively can be arranged (as shown in FIG. 2). The outlet 21 is connected to a brake cylinder $F_1$ of the left side front wheel by means of a line $P_{1f}$, and the outlet 21' is connected to the right side front wheel brake cylinder $F_2$ by means of a line $P_{2f}$. Thereby, the pressurized liquid in the pressure spaces $A_1$ and $A_2$ is supplied directly through the annular space 12 and 12' to the front wheel brake cylinders $F_1$ and $F_2$ irrespective to the actuation of the control valve.

In the embodiment of FIG. 2, valve means for opening and closing the liquid passage is constituted by the valve seats 6, 6' secured in the recesses 4, 4' of the valve members 3, 3', valve balls 7, 7' disposed in the recesses 4, 4', the valve rods 10, 10' secured to the caps 9, 9', and springs 8, 8' acting on the valve balls. However, in a modification illustrated in FIG. 3, the valve means are formed around the outer periphery of the valve members 3, 3'. Namely, annular valve seats 6, 6' are secured on the inner ends of caps 9, 9', and annular valve 7, 7' for engaging with the valve seats 6, 6' are formed on the outer peripheries of the valve members 3, 3'. In the first embodiment, hydraulic pressure in the outlets 16, 16' acts on circular areas defined by the large diameter portions $3b$, $3b'$ of the valve members 3, 3', while in the embodiment of FIG. 3, hydraulic pressure in the outlets 16, 16' acts on circular areas defined by the valve seats 6, 6', more precisely, the areas within circular lines on the valve seats 6, 6' which are formed by the engagement with annular valve portions 7, 7'. Although the inner diameter of the valve seats 6, 6' and the outer diameter of the valve portions 7, 7' are shown to have relatively similar dimensions in FIG. 3, it will be noted that the right-side or the inclined edges of the valve portions 7, 7' are adapted to engage with the left-side edges of the inner periphery of the valve seats 6, 6'.

It will be appreciated that valve means of this invention can take any form, as long as the valve members 3, 3' can move by receiving hydraulic pressure in the liquid passage so as to open or close the liquid passage.

Figure 4:
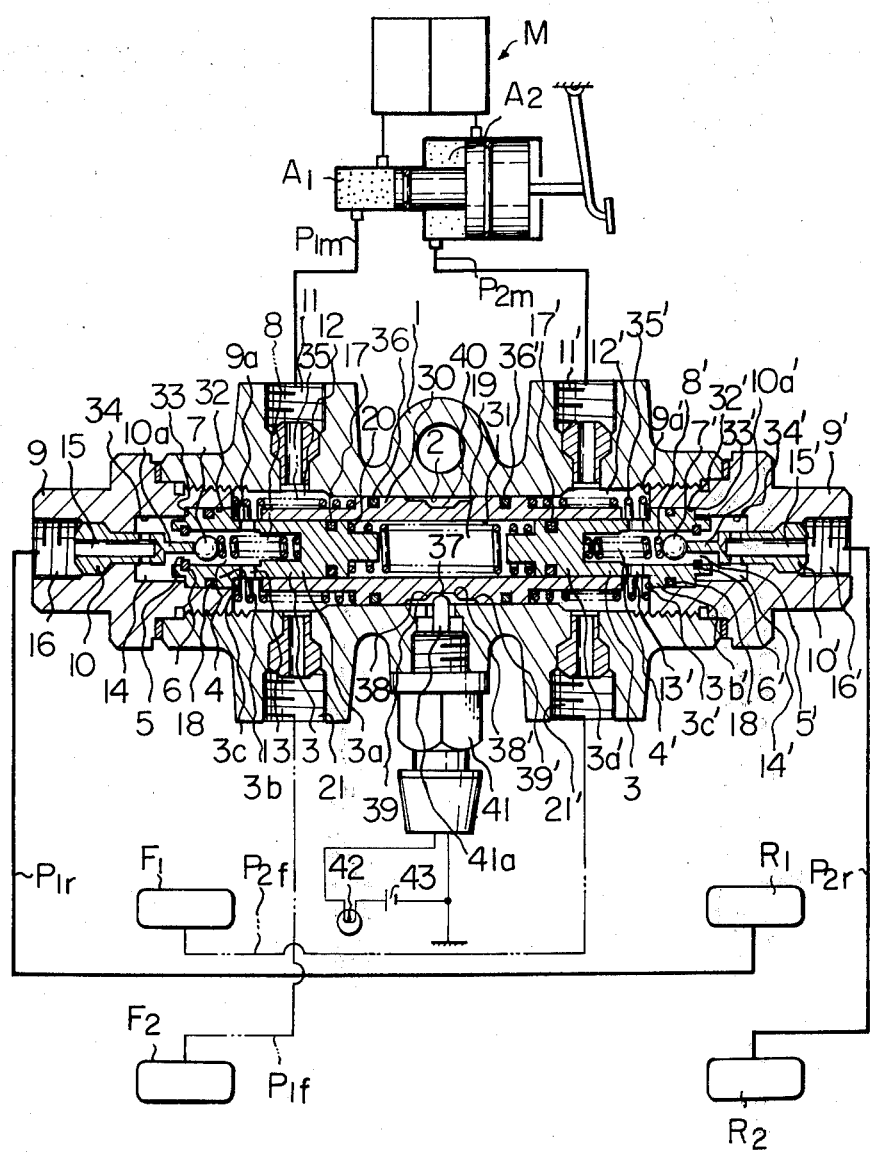
FIG. 4 is a longitudinal cross-sectional view of another embodiment of the brake pressure control valve of this invention.

FIG. 4 shows another embodiment of this invention which is generally similar to the first embodiment.

In this embodiment, a cap 9 closing the left end of a through bore 2 of a housing 1 has formed at its inner end a bore 34 defining a recess 14 and, the inner end of which is counterbored so as to form a bore 32 for slidably receiving the large diameter portion 3b of a valve member 3. The small diameter portion 3a of the valve member 3 is slidably received in a through bore 31 axially extending through a free piston or a sleeve 30 which, in turn, is slidably received in the central portion of the through bore 2 of the housing 1. A spring 35 is disposed between the inner end of the cap 9 and the free piston 30 for urging the free piston 30 inwardly. A liquid passage is formed between the inlet 11 and the outlet 16 by means of, as in the case of FIG. 2, an annular space 12 formed within the bore 2, a bore 13 formed in the valve member 3, a recess 4 formed within the valve member 3, an aperture 5 defined between a valve seat 6 and a valve rod 10, a recess 14, and a passage 15 formed within the valve rod 10. Valve means for opening and closing the liquid passage is constituted by the annular valve seat 6 secured to the valve body 3 and a valve ball 7 supported on the extreme end 10a of the valve rod 10 and arranged within the recess 4.

Shown at 36, 36' are seal rings disposed around the outer periphery of the free piston 30.

The control valve of FIG. 4 includes a failure warning device comprising a warning circuit constituted by an electric switch 41, an indicator such as a warning lamp 42 or a buzzer, and an electric source 43. The electric switch 41 includes an actuator 41a which engages with a groove 40 formed on the central portion of the outer periphery of the free piston 30. The groove 40 includes a central small diameter portion 37, two large diameter portions 39 and 39', and tapered or inclined portions 38 and 38' connecting the small diameter portion with the large diameter portions. When the control valve is in normal inoperative position, the actuator 41a of the electric switch 41 engages with the small diameter portion 37. But when failure occurs in either of the braking circuits, the free piston 30 is urged rightward or leftward, of the position shown in FIG. 4, compressing the spring 35' or 35 and, the actuator 41a engages with the large diameter portion 38 or 38', thus, actuating the electric warning circuit.

In this embodiment, free piston 30 receives at both ends thereof hydraulic pressure from the separate braking circuits at both ends and moves freely in accordance with small pressure difference between both braking circuits so as to obtain a balanced pressure position, but the displacement caused therefrom is relatively small, whereby the warning actuator 41 will not be actuated.

The operation and the constitution of the embodiment shown in FIG. 4 are, in other respects, similar to those of the first embodiment.

It will be noted that, in the first embodiment, the pressure balancing action of the control valve will be effected after a predetermined level of pressure is established in each of the braking circuits and the valve members 3 and 3' are moved from their stationary positions.

However, in the embodiment in FIG. 4, the pressure balancing action can be attained irrespective of the movement of the valve members 3 and 3', and the spring forces of the springs 35, 35' acting on the free piston 30 can be made weaker than the spring force of the spring 20 acting on the valve members 3, 3'. The operating characteristics or the cut-off pressure of the pressure control valve is determined by the spring force of the spring 20. Thus, the spring 30 is required to have a relatively high spring force, while the springs 35, 35' are desired to show relatively low spring forces, since the free piston 30 acts as an element of a pressure difference warning actuating device in which the piston 30 moves to one of the extreme positions when failure occurs in either of the braking circuits and remains at that position even after the braking pressure of another braking circuit is released.

Figure 3:
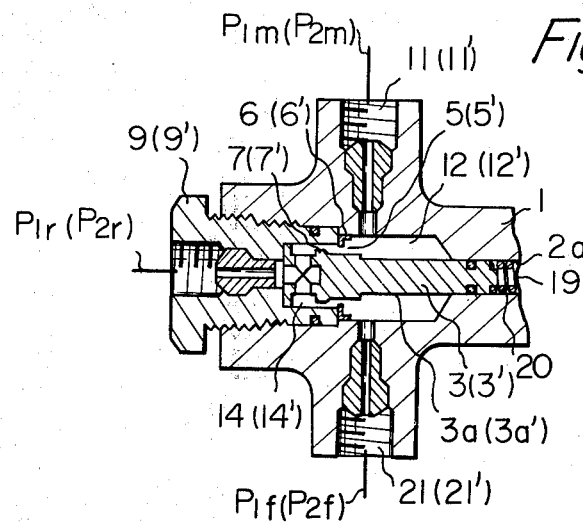
FIG. 3 is a partial cross-sectional view of a modified form of the brake pressure control view of FIG. 2.
Figure 5:
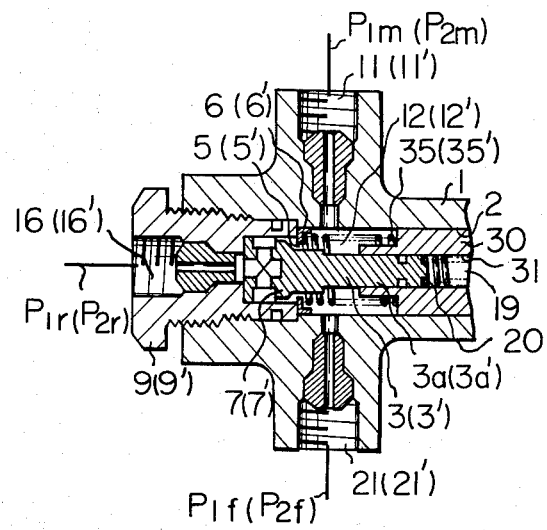
FIG. 5 is a partial cross-sectional view of a modified form of the brake pressure control valve of FIG. 4.

FIG. 5 shows a modified form of a valve mechanism similar to that of FIG. 3, but incorporating the features of the embodiment of FIG. 4, and, therefore, a detailed description thereof will be omitted.

FIG. 6 shows a still further embodiment of this invention, in which, instead of the free piston 30 in FIG. 4, a free piston 50 is axially freely slidable with both ends thereof fitted in bores formed in the valve members 3 and 3'. The bores receiving the free piston 50 define recesses 4 and 4' in respective valve members 3 and 3'. In this case, springs 8 and 8' urging valve balls 7 and 7' toward their valve seats 6 and 6' also act on the free piston 50 for urging the free piston to its neutral position.

The operational characteristics of this embodiment are similar to those in the embodiment of FIG. 4, although the failure warning device is not incorporated.

Figure 7:
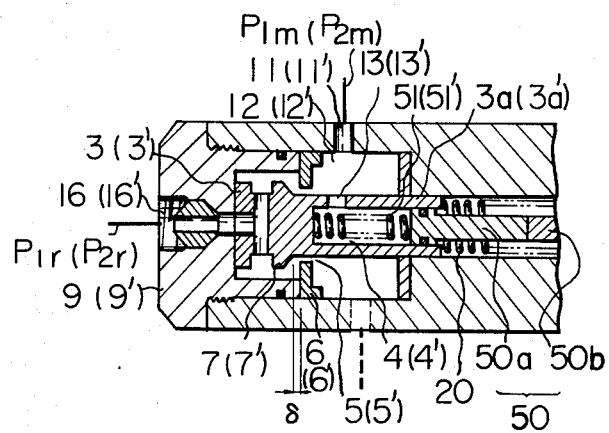
FIG. 7 is a partial cross-sectional view of a modified form of the brake pressure control valve of FIG. 6.

The embodiment shown in FIG. 7 is a modification of FIG. 6 but including features similar to those of FIG. 3. Instead of the unitary free piston 50 of FIG. 6, there are provided two separate pistons 50a and 50b abutting with each other and being urged toward each other by springs 51 and 51' disposed between the valve members and the free pistons. In this case spring 20 acting between two valve members 3 and 3' cooperate with springs 51 and 51' for determining the operating pressure or the valve closing pressure.

As described above, the pressure control valve of this invention is particularly adapted for use in a split system type hydraulic braking system in a vehicle in which fluid under pressure is supplied to rear wheels of the vehicle by means of two separate braking circuits and pressure balancing between these two circuits is required. According to the invention, balanced pressure can be attained in the two circuits when the brakes are actuated.

Since the valve members controlling hydraulic pressures in respective braking circuits receive the same spring force which is afforded by one or more springs interposed therebetween, and move axially as a unit for effecting opening and closing the liquid passages, balanced pressure can be automatically attained.

Two valve mechanisms incorporated in the control valve can be constructed of the same design, thus the design and construction of the valve is very easy and economical.

We claim:

1. A brake hydraulic pressure control valve comprising:
   a housing;
   two separate liquid passages provided in said housing, each said passage having a first end connected to a respective separate source of hydraulic pressure and a second end connected to a respective brake cylinder;
   two valve members slidably disposed in said housing, each said valve member having a first end, said first ends opposing each other, and a second end exposed to a respective one of said liquid passages, and each said valve member being provided with valve means for opening and closing said respective one liquid passage; and a single spring means disposed between said opposed first ends of the valve members acting simultaneously on said two valve members for moving said two valve members away from each other to opened valve positions and for transmitting forces between said two valve members.

2. A brake pressure control valve as claimed in claim 1, wherein each said valve means is held open when pressure is not established in the respective said liquid passage and is adapted to close when the respective said valve member is moved axially inward by a predetermined distance due to pressure received in said second end of the respective said liquid passage.

3. A brake pressure control valve as claimed in claim 1, wherein said opposed first ends of said valve members have diameters smaller than those of said second ends of said valve members.

4. A brake hydraulic pressure control valve comprising:

a housing;

two liquid passages provided in said housing, each said housing having a first end connected to a respective source of hydraulic pressure and a second end connected to a respective brake cylinder;

a free piston slidably fitted in said housing and adapted to receive at opposite ends thereof hydraulic pressure from different of said liquid passages;

two valve members slidably fitted in said free piston, each said valve member having a first end, said first ends opposing each other, and a second end exposed to a respective one of said liquid passages, and each said valve member being provided with valve means for opening and closing said respective one liquid passage; and a single spring disposed between said opposed first ends of the valve members to act simultaneously on said two valve members and to move said two valve members away from each other to opened valve positions.

5. A brake pressure control valve as claimed in claim 4, further comprising a switch, incorporated in a brake system trouble detecting circuit, provided in said housing, said switch being positioned to be turned on or off in response to the displacement of said free piston.

6. A brake pressure control valve comprising:

a housing;

two liquid passages provided in said housing, each said passage having a first end connected to a respective source of hydraulic pressure and a second end connected to a respective brake cylinder;

two valve members slidably disposed in said housing, each said valve member having a first end, said first ends opposing each other, and a second end exposed to a respective one of said liquid passages, and each said valve member being provided with valve means for opening and closing said respective one liquid passage;

a single spring disposed between said opposed first ends of the valve members to act simultaneously on said two valve members and to move said two valve members away from each other to opened valve positions; and a free piston, opposite ends of which are slidably fitted within one of said valve members and subjected to the hydraulic pressure in the respective said liquid passages.

* * * * *